United States Patent
Bertagni et al.

(10) Patent No.: US 6,721,436 B1
(45) Date of Patent: Apr. 13, 2004

(54) REMOTE EDGE-DRIVEN PANEL SPEAKER

(75) Inventors: Alejandro Bertagni, Lake Forest, CA (US); Eduardo Bertagni, Tustin, CA (US)

(73) Assignee: Sound Advance Systems, Inc., Santa Ana, CA (US)

( * ) Notice: Subject to any disclaimer, the term of this patent is extended or adjusted under 35 U.S.C. 154(b) by 0 days.

(21) Appl. No.: 09/538,861

(22) Filed: Mar. 29, 2000

(51) Int. Cl.[7] .............................................. H04R 25/00
(52) U.S. Cl. ...................... 381/423; 381/152; 381/430; 381/186; 381/389
(58) Field of Search ................................ 381/152, 431, 381/423, 386, 389, 302, 430, 186, 182, 365

(56) References Cited

U.S. PATENT DOCUMENTS

| | | |
|---|---|---|
| 1,831,484 A | 11/1931 | Duffy |
| 1,839,137 A | 12/1931 | Wunner |
| 1,866,090 A | 7/1932 | De Forest |
| 2,203,428 A | 6/1940 | Ditsche ........................ 181/31 |
| 3,239,029 A | 3/1966 | Namon ......................... 181/32 |
| 3,285,362 A | 11/1966 | Ducuing et al. ............... 181/5 |
| 4,514,599 A | 4/1985 | Yanagishima et al. . 179/181 W |
| 6,044,159 A | 3/2000 | Schmertmann et al. ...... 381/186 |
| 6,061,461 A * | 5/2000 | Paddock ....................... 381/424 |
| 6,094,496 A * | 7/2000 | Stowers, Sr. ................. 381/362 |
| 6,278,787 B1 * | 8/2001 | Azima ......................... 381/152 |
| 6,320,967 B1 * | 11/2001 | Azima et al. .................. 381/86 |
| 6,324,294 B1 * | 11/2001 | Azima et al. ................ 381/381 |
| 6,332,029 B1 * | 12/2001 | Azima et al. ................ 381/152 |
| 6,377,695 B1 * | 4/2002 | Azima et al. ................ 381/152 |
| 6,606,390 B2 * | 8/2003 | Azima ......................... 381/152 |

FOREIGN PATENT DOCUMENTS

| | | |
|---|---|---|
| WO | WO 98/42536 | 10/1998 |
| WO | WO 99/37121 | 7/1999 |
| WO | WO 00/07408 | 2/2000 |
| WO | WO 00/13464 | 3/2000 |
| WO | WO 00/35242 | 6/2000 |

\* cited by examiner

Primary Examiner—Curtis Kuntz
Assistant Examiner—Tuân Dúc Nguyen
(74) Attorney, Agent, or Firm—Sheppard, Mullin, Richter & Hampton LLP

(57) ABSTRACT

A loudspeaker for vehicles having cabins, the loudspeaker including a diaphragm including a first, planar portion for radiating acoustic energy and a second, planar portion for transmitting vibrational energy from a voice coil driver to the first portion. The first portion is incorporated into an inner surface of the vehicle's cabin. The second portion extends from the first portion to a location outside of the cabin, where the voice coil driver is located.

12 Claims, 4 Drawing Sheets

REMOTE EDGE-DRIVEN PANEL SPEAKER

BACKGROUND OF THE INVENTION

The present invention relates generally to loudspeakers, and, more particularly, to an apparatus and a related method for producing sound from a panel in a cabin-like environment.

Speakers are used in a wide variety of environments. While some environments are conducive to placing speakers appropriately for maximized sound quality, other environments such as vehicle interiors typically place constraints on speaker location, size and shape. In such environments, a common solutions is to mount small speakers in less than optimal locations, to the detriment of sound quality.

Typical loudspeaker systems for automobiles include two conventional speakers that are either mounted facing inward in the lower front door panels, or mounted facing upward in the dashboard. Additionally, two conventional speakers are mounted facing upward in the rear panel, facing upward to the rear window.

Door panel speakers that face inward directly toward passengers in the car are generally preferable. However, they necessarily must have a small size to fit within the limited confines of a door panel. Additionally, they typically direct sound toward the legs of occupants in the front seats, which reduces sound quality. Additionally, such speakers are generally difficult to hear from the rear seats.

There is generally more room for dashboard and rear panel speakers because they can extend out of the passenger cabin into the engine compartment or trunk area, and thus such speakers are often not as restricted in size as the door panel speakers. However, their sound is reflected from the front and rear windows, respectively, which adversely affects sound quality. Additionally, all of the above-listed speaker locations are substantially more appropriate for some occupants' listening pleasure than for others, leading to difficulties in providing reasonable lateral and fore-and-aft balancing of the sound for multiple occupants.

An alternate form of a loudspeaker known as a planar diaphragm loudspeaker is known for providing high quality sound from a camouflaged location in residential or commercial building. The diaphragm of such a loudspeaker is typically formed by a relatively stiff and substantially planar diaphragm that may be supported by a frame around the edges of the diaphragm. An electromagnetic driver, in the form of a voice coil assembly, is coupled to the rear surface of the diaphragm, and is also mounted to the frame. The voice coil or driver presses on a circular plate called a hammer, which, in turn, vibrates the diaphragm at acoustic frequencies to produce sound.

Typically, the planar diaphragm is constructed of a pre-expanded cellular plastic material, such as polystyrene or STYROFOAM®. The front, visible side of the diaphragm is flat, and may be disguised as a ceiling tile or section of wall. The rear of the diaphragm, where the voice coil or driver is mounted, while generally planar, has a specific contour to improve the sound quality of the loudspeaker. These types of loudspeakers are well suited for architectural use in ceilings and walls, where there is adequate space to mount a large flat panel of reasonable size. Such loudspeakers, while highly advantageous for architectural use, would typically suffer many of the same size disabilities as conventional speakers if installed in a vehicle cabin. In particular, good planar diaphragm loudspeakers would require both adequate surface area for the diaphragm and adequate depth for the voice coil.

Accordingly, there has existed a need for an improved loudspeaker, and a related method, to provide high quality omni-directional sound reproduction in an environment having structural limitations due to imposed structural constraints, such as in a vehicle cabin. The present invention satisfies these and other needs, and provides further related advantages.

SUMMARY OF THE INVENTION

The present invention provides a loudspeaker, and a related method for producing sound, which is particularly suited for use in cabin-like environments having structural limitations due to imposed constraints and/or for use in environments requiring the sound to be focused on individual listeners.

Embodiments of the loudspeaker of the invention can include an generally planar acoustic panel, a voice coil driver, and a transmission member extending between an edge of the acoustic panel and the voice coil driver. The transmission member conducts the vibrational energy from the voice coil driver to the acoustic panel. The voice coil driver is configured to drive the acoustic panel so as to excite the acoustic panel in various acoustic modes of vibration.

Advantageously, some preferred embodiments of the loudspeaker can be incorporated in a vehicle, where the vehicle's body is equipped with an enclosure forming a cabin interior. The loudspeaker's acoustic panel is incorporated into the enclosure such that its sound radiating surface forms part of an inner surface of the enclosure, while the transmission member extends outside of the cabin to avoid structural limitations within the cabin.

Other embodiments of the loudspeaker of the invention can include an acoustic panel having a curvature between two ends, where one end is supported, and also a voice coil driver configured to drive the acoustic panel along an edge at the other end of the acoustic panel. The voice coil driver is thereby configured so as to flex the acoustic panel along its curvature and excite the acoustic panel in various modes of vibration at acoustic frequencies.

Other features and advantages of the invention will become apparent from the following detailed description of the preferred embodiment, taken in conjunction with the accompanying drawings, which illustrate, by way of example, the principles of the invention.

DETAILED DESCRIPTION OF THE PREFERRED EMBODIMENTS

Figure 1A:
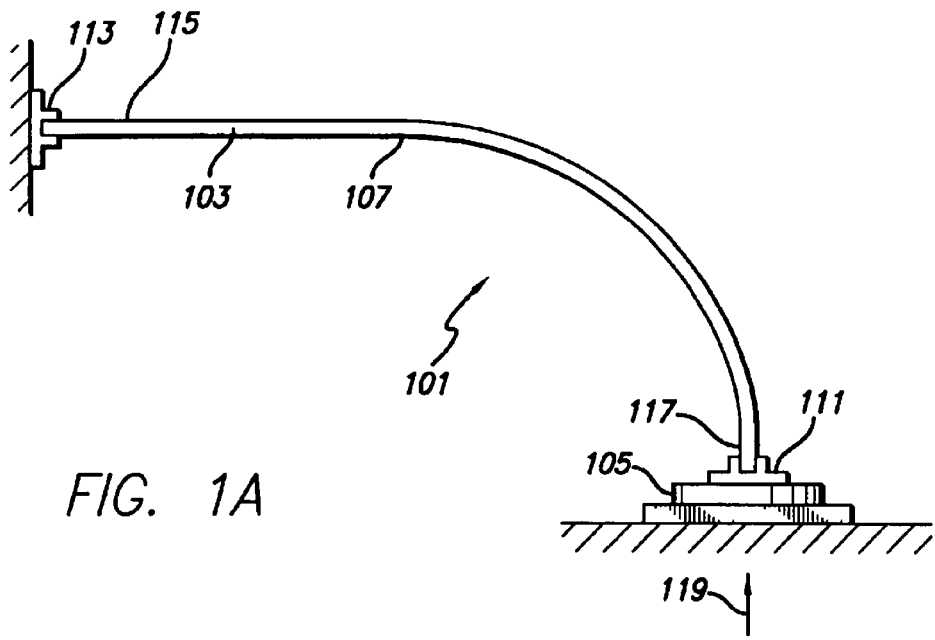
FIG. 1A is a front elevational view of a first embodiment of a loudspeaker embodying features of the present invention.
Figure 1B:
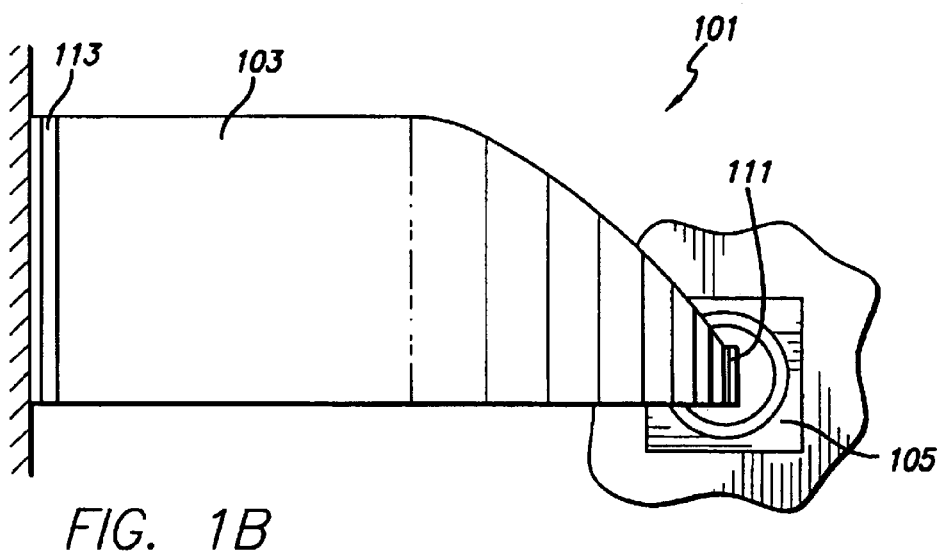
FIG. 1B is a top elevational view of the loudspeaker depicted in FIG. 1A.

Referring now to the drawings, and more particularly to FIGS. 1A and 1B thereof, there is shown a first embodiment of a loudspeaker 101. The loudspeaker includes a diaphragm forming an acoustic panel 103, and a voice coil driver 105. The acoustic panel is preferably configured and suspended to allow modal vibration over a range of acoustic frequencies. The voice coil driver is connected to the acoustic panel in such a way that the voice coil driver can drive the acoustic panel to excite the acoustic panel in various modes of vibration at acoustic frequencies.

The acoustic panel 103 of the first embodiment is configured with a shape that is generally planar, with an added curvature to form a preselected, curved shape. The curved shape can be formed either by flexing the body from a different (possibly curved) shape and holding it in that flexed position, or by forming the unflexed shape of the acoustic panel to be the preselected, curved shape, such as by casting, molding, carving or otherwise fixing the shape. The acoustic panel includes a sound-radiating surface 107 configured to excite sound waves outward in a desired direction when the acoustic panel is in vibration. The acoustic panel is composed of a semi-rigid material appropriate for generating sound through modal vibration. Suitable materials include Modified Expandable Polystyrene, high-temperature expandable polystyrene (e.g., DYTHERM® or GECET®) or PMI (polymethacrylirmide) rigid foam (e.g., Rohm ROHACELL®).

The first embodiment's acoustic panel 103 is preferably suspended in compression between a first bracket 111 and a second bracket 113 holding a first end 115 and a second end 117 of the acoustic panel, respectively. This compression flexes the panel to bow with the curvature to hold the preselected, curved shape, such that the acoustic panel does not extend in a straight line between its first and second ends. Preferably, the acoustic panel's curvature places an approximately 90 degree bend in the acoustic panel. The voice coil driver 105 is preferably connected to the acoustic panel 103 at a given location on the acoustic panel so as to drive the acoustic panel in a direction parallel to the plane of its body at the given location (i.e., it is edge-driven). Thus, the voice coil driver flexes the acoustic panel along its curvature.

Preferably the voice coil driver 105 is connected to the acoustic panel 103 through the first bracket 111. The voice coil driver primarily drives the acoustic panel pistonically at low frequencies, while exciting significant modal vibration along a primary direction 119 of the acoustic panel's curvature (i.e., a direction of maximum curvature at some location on the acoustic panel) at high frequencies. The voice coil driver preferably drives the acoustic panel in a direction that flexes the curvature of the acoustic panel, and thereby creates modal vibration in the acoustic panel to make it an acoustic radiator.

The level of curvature in the acoustic panel affects the acoustic qualities (e.g., efficiency and filtering) of the loudspeaker. Simple testing of a given configuration, by bending the panel to different degrees and then measuring audio output per vibrational input, over a range of frequencies, will provide a database of information describing the acoustic qualities for various levels of curvature.

Figure 2A:
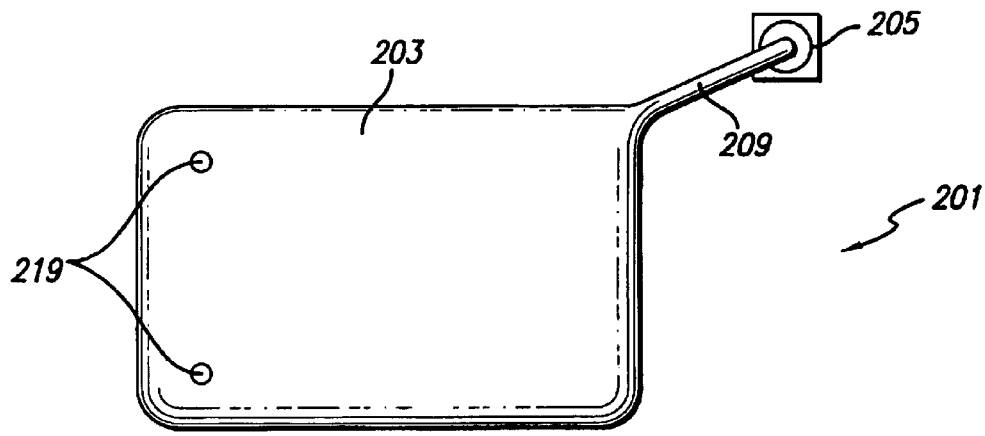
FIG. 2A is a top elevational view of a second embodiment of a loudspeaker embodying features of the present invention.
Figure 2B:
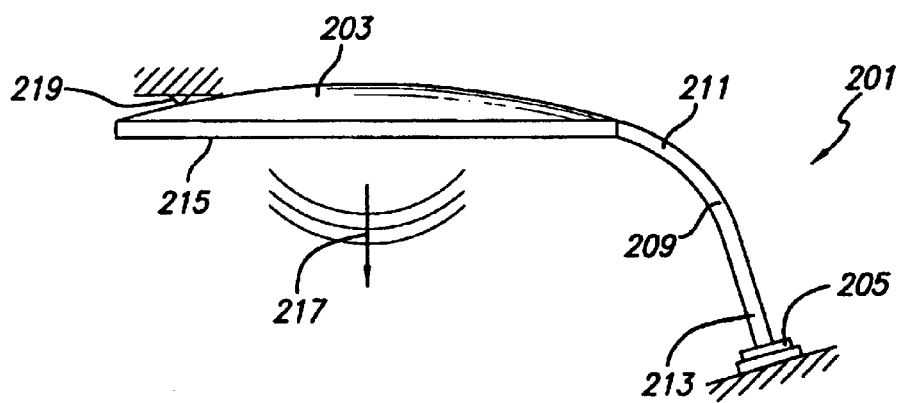
FIG. 2B is a front elevational view of the loudspeaker depicted in FIG. 2A.

In a second embodiment of a loudspeaker 201 under the present invention, referenced in FIGS. 2A and 2B, a diaphragm forming an acoustic panel 203 is driven by a voice coil driver 205. As with all other embodiments of the invention, the acoustic panel is preferably configured and suspended to allow modal vibration over a range of acoustic frequencies. The acoustic panel 203 is configured as a generally planar panel portion that serves as an acoustic radiator. A transmission member 209 serves to transmit vibrational energy from the voice coil driver to the acoustic panel. The acoustic panel is a substantially planar panel, optionally having a low level of curvature in one or two orthogonal directions. The transmission member is preferably an elongated, rod-like member having the acoustic panel located at a first end 211 and the voice coil driver at a second end 213. Alternatively, the transmission member could have other shapes, such as having an elongated planar shape having the acoustic panel located at a first end and the voice coil driver at a second end.

Preferably the transmission member 209 is not substantially coplanar with the acoustic panel 203, and more preferably, it longitudinally extends in a direction out of the plane of the acoustic panel. Preferably, but not necessarily, the acoustic panel is unitary with the transmission member, and is made of a like or similar material.

The transmission member 209 is preferably designed with modes of vibration appropriate to transfer the vibrational kinetic energy received from the voice coil driver 205 to the acoustic panel 203, thus placing them in the vibrational communication. The driving force of the voice coil driver is preferably delivered at the end of the transmission member 209 (i.e., aligned with the direction that the transmission member longitudinally extends) to excite vibrational modes of the transmission member, and thereby excite the vibrational modes of the acoustic panel. Alternatively, the voice coil driver could be configured to drive the transmission member in other directions at the second end. However, depending on the configuration, this could significantly affect the transmission characteristics of the transmission member (i.e., significant filtering could occur at various wavelengths).

The acoustic panel 203 of the second embodiment is preferably formed in the shape of a substantially planar body having a predetermined, slightly curved shape. The acoustic panel includes a sound-radiating surface 215 configured to excite sound waves in a desired direction 217 when the acoustic panel is in vibration. The acoustic panel 203 is preferably composed of a semi-rigid material appropriate for generating sound through modal vibration. The suitable materials for this embodiment are similar to those of the last embodiment.

The acoustic panel 203 is preferably suspended from a limited number of points using connectors 219 that do not significantly dampen vibration. Optimally, the connectors are positioned at a location on the acoustic panel that is distant from the point that the acoustic panel connects with the transmission member 209. By using the transmission member to transfer vibrational energy, the voice coil driver 205 can optionally be positioned a relatively large distance away from the acoustic panel 203.

The first and second embodiments of a loudspeaker under the present invention are both usable in a variety of applications. One such application is the formation of a personal audio environment for a single person, or for a limited number of persons. Another such application is as a speaker for a cabin-like environment, where individuals are placed in a relatively small confined space where traditional speakers might not be preferable for any of a variety of reasons.

Figure 3:
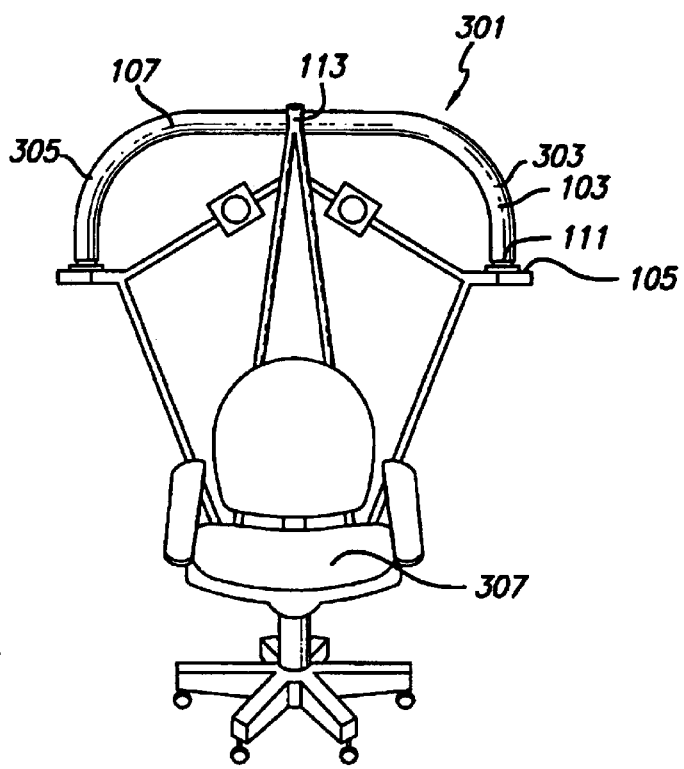
FIG. 3 is a front elevational view of a personal device for providing an audio environment, the device including two loudspeakers of the type depicted in FIG. 1A.

With reference to FIG. 3, a personal device 301 for providing an audio environment, of the present invention, incorporates a left loudspeaker 303 and a right loudspeaker 305 of the type described above as the first embodiment of a loudspeaker (depicted in FIGS. 1A and 1B). In particular, each loudspeaker includes an acoustic panel 103 and a voice coil driver 105 configured to drive the acoustic panel. Each acoustic panel has a curved shape formed by compressing it between a first bracket 111 and a second bracket 113, and each acoustic panel includes a sound-radiating surface 107 configured to excite sound waves inward toward a listening location. Naturally, an opposing side of the panel will radiate sound in an opposing direction, which can optionally be covered by shielding to block or absorb that sound.

The device 301 also preferably includes a chair 307 having a seat located such that a person sitting in the chair will have their ears located at the listening location. The loudspeakers' second brackets 113 preferably abut such that the loudspeakers' sound-radiating surfaces 107 partially encircle the head of a typical listener seated in the chair 307, such that stereo sound from the two speakers will seem to come from a wide variety of directions. The loudspeakers are (substantially) symmetrically located with respect to the chair.

Advantageously, this device 301 provides high quality sound for a person seated in the chair 307, but produces a very limited sound level outside of the preferred listening position. Thus, by configuring and locating one or more loudspeakers' curved radiating surfaces to extend around a listener's head, and by edge-driving the radiating surfaces, sound can be focused on the listener. Some other variations of this device embodiment could have other numbers of speakers in other configurations. For example, multiple loudspeakers can be used to reproduce sound in a multi-channel sound source format, such as DOLBY DIGITAL® 5.1 or DTS DIGITAL SURROUND®.

The device 301 is particularly preferable for arcade style games, either in a business (e.g., a video arcade) or a home. In particular, the device can further include a signal amplifier configured to take audio output from a home computer or a home video game and produce signals to drive the voice coil drivers. Using full systems comprising a computer or game machine and the loudspeaker device, game players can experience an audio-video gaming experience including a rich audile component. Furthermore, this concept can be understood to apply equally to non-gaming audio-only or audio-visual systems, such as educational systems, training systems, driving/flying simulators, and the like.

The loudspeakers of the invention can be utilized in many cabin-like enclosures, and particularly vehicles' cabin-like enclosures, such as car and truck cabins, aircraft cockpits and cabins, virtual reality environments, target shooting enclosures, amusement park rides, arcade games (e.g., car race games, air combat games, etc.). The enclosures can be of numerous configurations, such as full enclosures, partial overhead enclosures, and open-topped enclosures that circle behind people. The loudspeakers can be used to provide clear sound having useful directional components. For example, in an aircraft cockpit, the speakers could provide an alarm warning of danger coming from a particular direction, with the sound emanating from that direction. The speakers are particularly desirable in environments that have spacial limitations limiting the placement of speakers.

Figure 4:
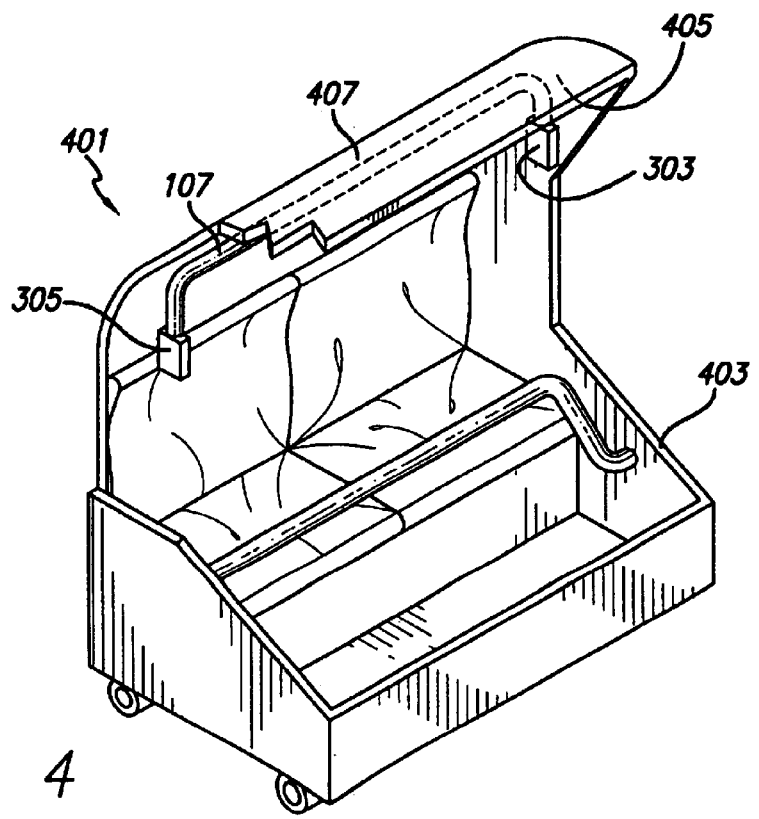
FIG. 4 is a perspective view of a semi-enclosed amusement park ride, the ride including two loudspeakers of the type depicted in FIG. 1A.

With reference to FIG. 4, a semi-enclosed amusement park ride cabin 401 incorporates the above personal device for providing an audio environment (depicted in FIG. 3), including the first embodiment of a loudspeaker. In particular, a wheeled vehicle body 403 includes an enclosure forming a cabin 401 for one to three seated riders that will be taken along a path through an audiovisual presentation. A left loudspeaker 303 and a right loudspeaker 305 are incorporated into the enclosure, having sound radiating surfaces 107 that form part of an inner wall 405 of the enclosure. The acoustic panels of the loudspeakers form a curved shape appropriate for a cabin-like interior, providing adequate head room while producing sound throughout the interior of the cabin. Wheeled, pulled or suspended devices for standing or sitting riders are also within the scope of the invention.

Advantageously, this cabin 401 provides high quality sound for riders within the cabin. Nevertheless; the cabin produces a low enough sound level outside of the cabin to allow multiple wheeled vehicles to travel in close proximity without having riders hear interfering sounds from other cabins.

Similar applications of the personal device for providing an audio environment can be envisioned for vehicles housing larger numbers of riders. For example, buses or trains could incorporate speakers into the curved panels connecting their walls with their ceilings. Likewise, aircraft could drive specially configured wall panels positioned periodically along the length of the aircraft.

Figure 5:
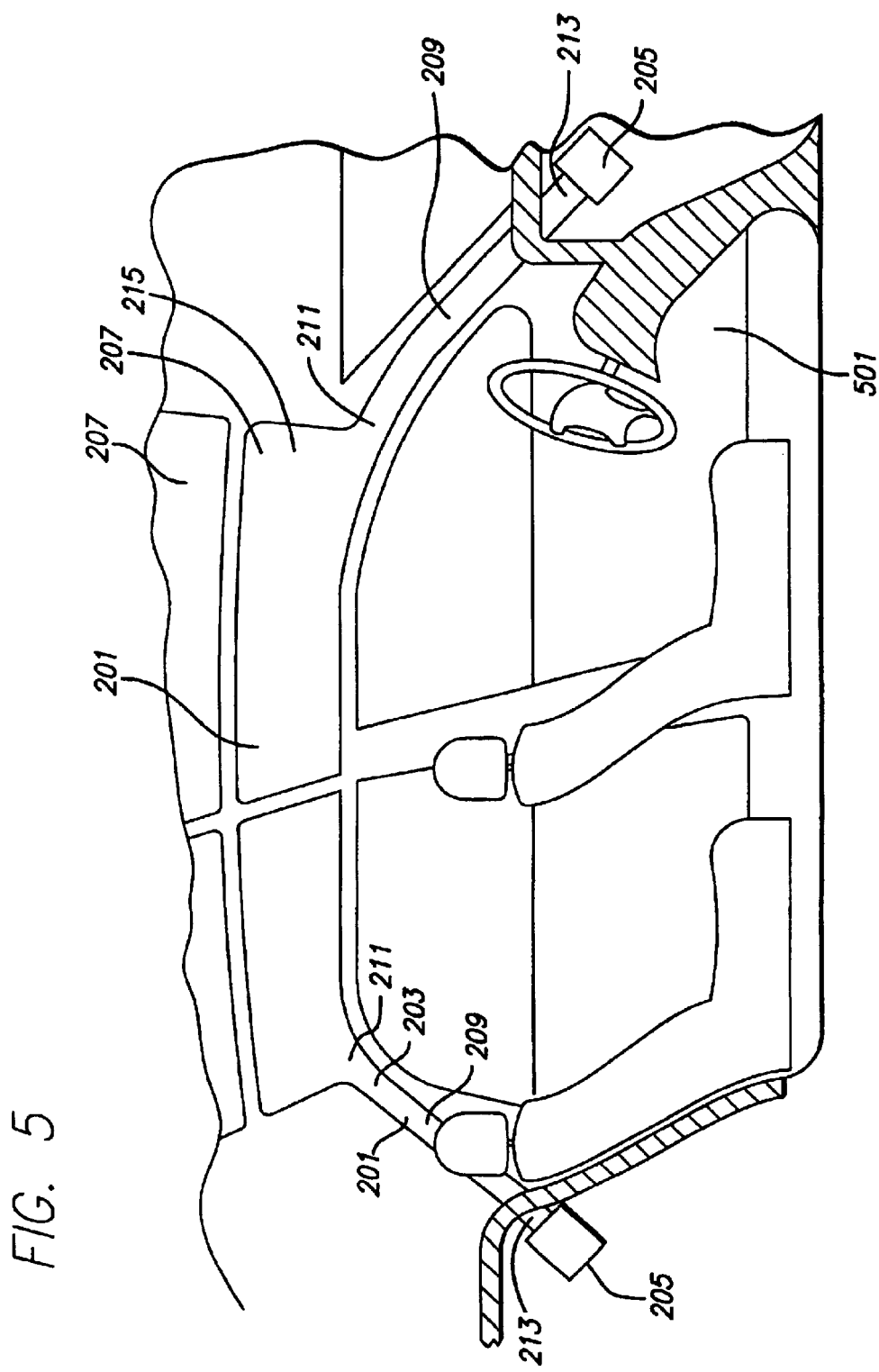
FIG. 5 is a partial, cutaway perspective view of an automobile, the automobile including four loudspeakers of the type depicted in FIG. 2A.

In some cabin-like settings, such as automobile cabins, the cabin's roof and walls are thin and little space is available to house a voice coil. With reference to FIG. 5, a portion of an automobile cabin 501 incorporates loudspeakers of the invention. In particular, the ceiling of the cabin incorporates four loudspeakers 201 of the type described above as the second embodiment of a loudspeaker (depicted in FIGS. 2A and 2B). Two loudspeakers' acoustic panels 203 are located over front seats, one being over the driver's side and one over the passenger's side. Likewise, two are located over the rear seats. The sound radiating surfaces of the acoustic panels therefore form part of the cabin interior.

In this configuration, each of the sound-radiating surface 215 of the loudspeakers direct sound directly at cabin occupants in the seats, and none of them are obstructed from radiating to occupants of any other seats. While the above arrangement of the four loudspeakers is preferable, other configurations are within the scope of the invention. For example, there can be fewer or greater numbers of loudspeakers in the cabin, and the loudspeakers do not necessarily have to align with seats.

Each loudspeaker's acoustic panel 203 is formed or deformed into the shape of a ceiling panel for its respective portion the cabin, and is incorporated into that portion of the cabin's ceiling. Each loudspeaker's transmission member 209 extends from one end 211 connecting to the acoustic panel to a second end 213, which preferably extends to have a portion entirely outside of the cabin's interior. Voice coil drivers 205 attach to the second ends of the transmission members to provide the vibrational energy to excite the acoustic panel in modal vibration.

In the vehicle's engine compartment and trunk area, there is room to place high quality voice coil drivers 205. Preferably, the portion of each transmission member 209 that connects to its respective voice coil driver is hidden from the view of cabin passengers. Preferably the transmission member passes down through the interior posts that suspend the vehicle's ceiling over the cabin, with the post's trim panel shielding any limited audile emissions coming from the transmission member.

Alternatively, the portion of the transmission member 209 passing down through the posts can be formed or deformed into the shape of an interior wall panel for its respective portion the post, and be incorporated into the post as that portion of the cabin's interior wall. Even though it is unshielded, the portion of the transmission member that passes through the cabin is relatively long and narrow, and produces minimal sound while transmitting vibrational energy to the acoustic panel 203.

Advantageously, this device provides high quality sound for riders in a vehicle cabin having limitations on the placement of conventional speakers. Thus, by configuring and incorporating one or more loudspeakers' acoustic panels into the walls and/or ceilings of the vehicle cabin, and by transmitting vibrational energy to the acoustic panels' primary acoustic panels from voice coil drivers outside of the vehicle cabin, high quality sound can be produced in the cabin which will be clearly audible by all passengers.

Variations of the above embodiment can include other configurations of the acoustic panels 203. For example, while the transmission members preferably extend into a hidden area, such as was described above, they could be configured to be entirely in view of cabin occupants, ending on the surface of the voice coil drivers which are located in a panel of the vehicle. The voice coil drivers would then preferably be located below the ends of the transmission members, in areas of the vehicle having more available depth than the ceiling or wall, such as in the dashboard or back panel area.

Because the voice coil drivers and the related ends of the transmission members are in acoustically less desirable locations, where any sound produced might be reflected off of glass, or shielded by the nearest rider, their direct contribution to the sound level in the cabin is minimized. This variation might find more suitable use in some applications where access to concealed areas is limited, such as in aircraft cabins or automobiles that lack a trunk.

Additionally, both the transmission member and the acoustic panel can be customized to produce various filtering effects. Also, the transmission member can be acoustically shielded so as to further limit its transmission of sound.

Furthermore, it is contemplated that embodiments of the inventions could include different combinations of aspects of the above described embodiments of the invention. For example, loudspeakers of the type described as the first embodiment, having transmission members, are within the scope of the invention.

From the foregoing description it will be appreciated that the present invention provides for an improved loudspeaker, and a related method, for providing high quality omni-directional sound reproduction in an environment having structural limitations due to imposed constraints, such as in a vehicle cabin. While a particular form of the invention has been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the invention. Accordingly, the invention is not intended to be limited, and is defined with reference to the following claims.

We claim:

1. A vehicle providing an audio environment for at least one person, comprising:
   a vehicle body equipped including an enclosure forming a cabin for the at least one person;
   a first loudspeaker and a second loudspeaker, the first and second loudspeakers each comprising
      an acoustic panel having a curvature between a first end and a second end of the acoustic panel such that the acoustic panel does not extend in a straight line from the first end to the second end, wherein an edge at the first end is supported, and
      a voice coil driver configured to drive into the edge of the acoustic panel at the second end of the acoustic panel so as to flex the acoustic panel along its curvature and excite the acoustic panel in various modes of vibration having acoustic frequencies; wherein the first and second loudspeakers are incorporated into the enclosure and have sound radiating surfaces that form part of an inner surface of the enclosure.

2. The vehicle of claim 1, and further comprising a seat for the at least one person to sit upon, wherein the first and second loudspeakers are symmetrically located with respect to the seat.

3. The vehicle of claim 1, wherein the acoustic panels of the first and second loudspeaker are each held in compression between the first end and the second end.

4. The vehicle of claim 1, the first and second loudspeaker each further comprising a transmission member extending between the edge of the acoustic panel at the second end of the acoustic panel and the voice coil driver, the transmission member placing the voice coil driver in vibrational communication with the acoustic panel.

5. A vehicle providing an audio environment for at last one person, comprising:
   a vehicle body including an enclosure forming a cabin interior for containing the at least one person; and
   a loudspeaker comprising
      an acoustic panel having a curvature between a first end and a second end of the acoustic panel such that the acoustic panel does not extend in a straight line from the first end to the second end, wherein an edge at the first end is supported, and
      a voice coil driver configured to drive into the edge of the acoustic panel at the second end of the acoustic panel so as to flex the acoustic panel along its curvature and excite the acoustic panel in various modes of vibration having acoustic frequencies; wherein the loudspeaker's acoustic panel is incorporated into the enclosure and has a sound radiating surface that forms part of a surface of the cabin interior.

6. The vehicle of claim 5, wherein the acoustic panel is held in compression between the first end and the second end.

7. The vehicle of claim 5, the loudspeaker further comprising a transmission member extending between the edge of the acoustic panel at the second end of the acoustic panel and the voice coil driver.

8. The vehicle of claim 7, wherein the transmission member extends outside of the cabin, and wherein the voice coil driver drives a portion of the transmission member that is outside of the cabin.

9. The vehicle of claim 7, wherein the acoustic panel radiates substantially more sound energy than the transmission member.

10. The vehicle of claim 7, wherein the transmission member extends in a direction outside the plane of the acoustic panel.

11. The vehicle of claim 7, wherein the transmission member is configured to vibrate modally to place the voice coil driver in vibrational communication with the acoustic panel.

12. The vehicle of claim 7, wherein the transmission member forms an elongated, rod-like shape.

* * * * *

UNITED STATES PATENT AND TRADEMARK OFFICE
CERTIFICATE OF CORRECTION

PATENT NO. : 6,721,436 B1
DATED : April 13, 2004
INVENTOR(S) : Alejandro Bertagni et al.

It is certified that error appears in the above-identified patent and that said Letters Patent is hereby corrected as shown below:

Column 3,
Line 23, change "polymethacrylimide" to -- polymethacrylirmide --

Column 8,
Line 14, change "last" to -- least --

Signed and Sealed this

Twenty-second Day of June, 2004

JON W. DUDAS
*Acting Director of the United States Patent and Trademark Office*